(12) United States Patent
Nonaka et al.

(10) Patent No.: US 6,690,527 B1
(45) Date of Patent: Feb. 10, 2004

(54) METHOD OF AND SYSTEM FOR RECORDING AND REPRODUCING INFORMATION DATA

(75) Inventors: Yoshiya Nonaka, Saitama-ken (JP); Hiroaki Shibasaki, Tokyo (JP)

(73) Assignee: Pioneer Corporation, Tokyo (JP)

( * ) Notice: Subject to any disclaimer, the term of this patent is extended or adjusted under 35 U.S.C. 154(b) by 164 days.

(21) Appl. No.: 09/709,584

(22) Filed: Nov. 13, 2000

(30) Foreign Application Priority Data

Nov. 30, 1999 (JP) ............................................. 11-341035

(51) Int. Cl.⁷ ............................................. G11B 15/04
(52) U.S. Cl. ..................................... 360/60; 369/47.12
(58) Field of Search ................... 360/60, 15; 369/47.12; 710/33

(56) References Cited

U.S. PATENT DOCUMENTS 6,034,618 A * 3/2000 Tatebayashi et al. .......... 340/5.8
6,222,807 B1 * 4/2001 Min-Jae .................... 369/47.12
6,240,469 B1 * 5/2001 Ishibashi ..................... 710/33

FOREIGN PATENT DOCUMENTS

EP 0-874-300 A2 10/1998

OTHER PUBLICATIONS

European Search Report dated Sep. 27, 2001.

* cited by examiner

Primary Examiner—Regina N. Holder
(74) Attorney, Agent, or Firm—Arent Fox Kintner Plotkin & Kahn, PLLC

(57) ABSTRACT

An information reading/recording method and system are provided for effecting data transmission among a plurality of information processing apparatuses. The method and the system include reading and transmitting information data recorded on a recording medium of one information processing apparatus, in accordance with a transmission request from another information processing apparatus. The method and system also includes rendering ineffective a predetermined unit amount of information data recorded on the recording medium of the one information processing apparatus, at a time a predetermined unit amount of information data has already been transmitted therefrom, and recording the predetermined unit amount of information data that has already been transmitted therefrom. In addition, the method and system include recording the predetermined unit amount of transmitted information data in the another information processing apparatus which has received the transmitted information data.

10 Claims, 7 Drawing Sheets

METHOD OF AND SYSTEM FOR RECORDING AND REPRODUCING INFORMATION DATA

BACKGROUND OF THE INVENTION

The present invention relates to a method of and a system for recording and reproducing information data, which may be suitably used for protecting one's copyright when music and image information data or the like are transmitted for distribution by way of electronic communication system.

Recently, audio music data, video image data and computer program data are usually transmitted for distribution by way of electronic communication system. Such an information distribution is carried out under a prerequisite that the information data can only be distributed by a legally allowed person or company. Namely, in order to forbid an unlawful copy so as to avoid an economic damage to an original author, there have been a regulation prescribing that once the above information data has been received by one recording-reproducing apparatus, the same information data must not be copied from one recording-reproducing apparatus to another. Here, "copy" means that the same identical data is existing in two or more mediums.

However, under the above-mentioned regulation, there has been the following problem which has been experienced by users who have legally obtained the above-described information data.

For example, if a person wants to enjoy the music information recorded in an internal memory means such as a hard disc of a computer, he or she has to go to the place where the computer has been set. Alternatively, the computer has to be transported to a place where the person is.

Moreover, under the above regulation, the above-described information data must not be copied to an easily portable machine such as an MD player.

SUMMARY OF THE INVENTION

It is an object of the present invention to provide an improved method and an improved system for recording and reproducing desired information data, such that when information data has already been transmitted from one recording medium to another, information reproduction from the one recording medium may be forbidden (if necessary), thereby preventing the same identical information from being recorded on several different recording mediums, thus effectively preventing an unauthorized copying.

It is another object of the present invention to provide an improved method and an improved system for recording and reproducing information, such that the unit of information data to be transmitted is considerably small so that it is possible to almost simultaneously reproduce information data on several different apparatus, without the necessity of duplicating these informations.

According to the present invention, there is provided an information reading and recording method for effecting data transmission among a plurality of information processing apparatus, said method comprising the steps of: reading and transmitting information data recorded on a recording medium of one information processing apparatus, in accordance with a transmission request from another information processing apparatus; rendering ineffective a predetermined unit amount of information data recorded on the recording medium of said one information processing apparatus, at a time a predetermined unit amount of information data has already been transmitted therefrom; recording the predetermined unit amount of transmitted information data in said another information processing apparatus which has received the transmitted information data.

In one aspect of the present invention, said another information processing apparatus is adapted to record the transmitted information data while at the same time reproducing the transmitted information.

In another aspect of the present invention, each predetermined unit amount of information data is provided with a transmitted code indicating that said unit amount of information has already been transmitted therefrom, so that it is allowed to determine whether the information to be transmitted should be reproduced.

Further, according to the present invention, there is provided an information reading system for reading information data from a recording medium and transmitting the information data in accordance with a transmission request, said system comprising; reading means for reading-out information data from the recording medium in accordance with a control signal; transmitting means for transmitting the read-out information data; storing means for storing transmitted code indicating that information data has already been transmitted, corresponding to each unit amount of information to be transmitted; detector means for detecting transmitted code; and control means for producing control signal for controlling the reading of said information data, and for producing another control signal for forbidding the reading of the information data when a corresponding transmitted code has been detected.

In another aspect of the present invention, the transmitting means for transmitting the read-out information comprises; confirmation means for confirming whether or not a plurality of different information processing apparatus are allowed to be connected with one another for exchanging predetermined data in accordance with a predetermined protocol; and an allowance issuing means for issuing an allowance for transmitting information data when it has been confirmed by the confirmation means that the plurality of different information processing apparatus are all legally connected with one another for exchanging predetermined data in accordance with a predetermined protocol.

Moreover, according to the present invention, there is provided an information recording system adapted to record information containing transmitted code corresponding to information data to be transmitted, said system comprising: determining means for determining whether or not there is existing transmitted code corresponding to transmitted information data; and recording means for recording the transmitted information data when it is determined by the determining means that there is not existing said transmitted code, and for erasing the transmitted code when it is determined that there is existing said transmitted code.

In a still further aspect of the present invention, said recording means includes: confirmation means for confirming whether or not a plurality of different information processing apparatus are allowed to be connected with one another for exchanging predetermined data in accordance with a predetermined protocol; and an allowance issuing means for issuing an allowance for transmitting information data when it has been confirmed by the confirmation means that the plurality of different information processing apparatus are all legally connected with one another for exchanging predetermined data in accordance with a predetermined protocol. With the use of the present invention, when information data is transmitted from a recording medium of one apparatus to a recording medium of another apparatus, it is allowed to forbid the reading of information data from the recording medium of the one apparatus, thereby ensuring that the same identical data information will not be existing in several different recording mediums. In this way, information data can be recorded in a recording medium such as an MD (Mini Disc) having an excellent portability and owned by a person of good will, without damaging a concept of duplicating information data. Further, with regard to the provision of transmitted flag, since the information data to be transmitted has been processed to be present in quite small unit such as ECC block unit, information data such as music data can be reproduced almost simultaneously in a plurality of apparatus (among which information data is transmitted from one another), without duplication of the information data. Furthermore, since the movement of information data is administrated using data transmission unit and transmitted code, it is allowed not to erase the information data in transmission unit, thereby making it possible to reduce an overhead when the movement of information data is repeated. In addition, since the information data is transmitted, read and recorded under a condition where a mutual confirmation has been completed, it is sure to prevent any unlawful duplication of the information data and to prevent the information data from being accidentally erased.

The above objects and features of the present invention will become better understood from the following description with reference to the accompanying drawings.

DETAILED DESCRIPTION OF THE PREFERRED EMBODIMENTS

Figure 1:
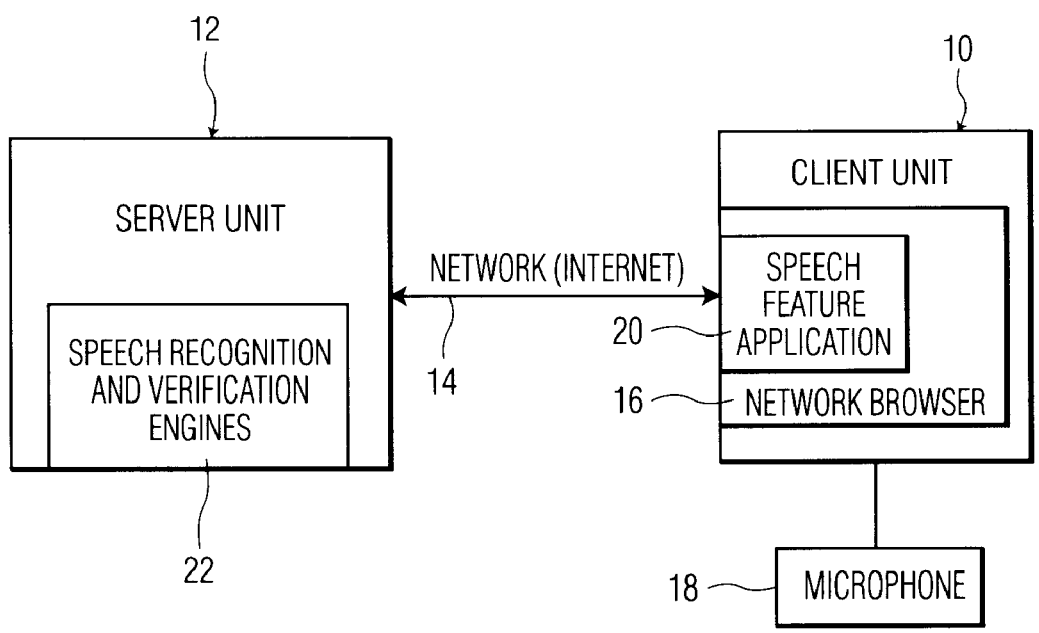
FIG. 1 is an explanatory view showing an information recording and reproducing system formed according to the present invention.

FIG. 1 is an explanatory view showing an information recording and reproducing system formed according to the present invention. As shown in FIG. 1, the information recording and reproducing system comprises a home server 1, a plurality of wireless speakers 3, and a portable wireless terminal 2. Here, the home server 1 serves as a sound source and is the most important part in the system. The plurality of wireless speakers 3 serve as man-machine interfaces and are decentralized, thus forming a constitution enabling a user to enjoy reproduced information data and are all connected with the home server 1. In this way, with the movement of the wireless terminal 2, it is allowed to select (for use) one of the plurality of the wireless speakers 3.

Figure 2A:
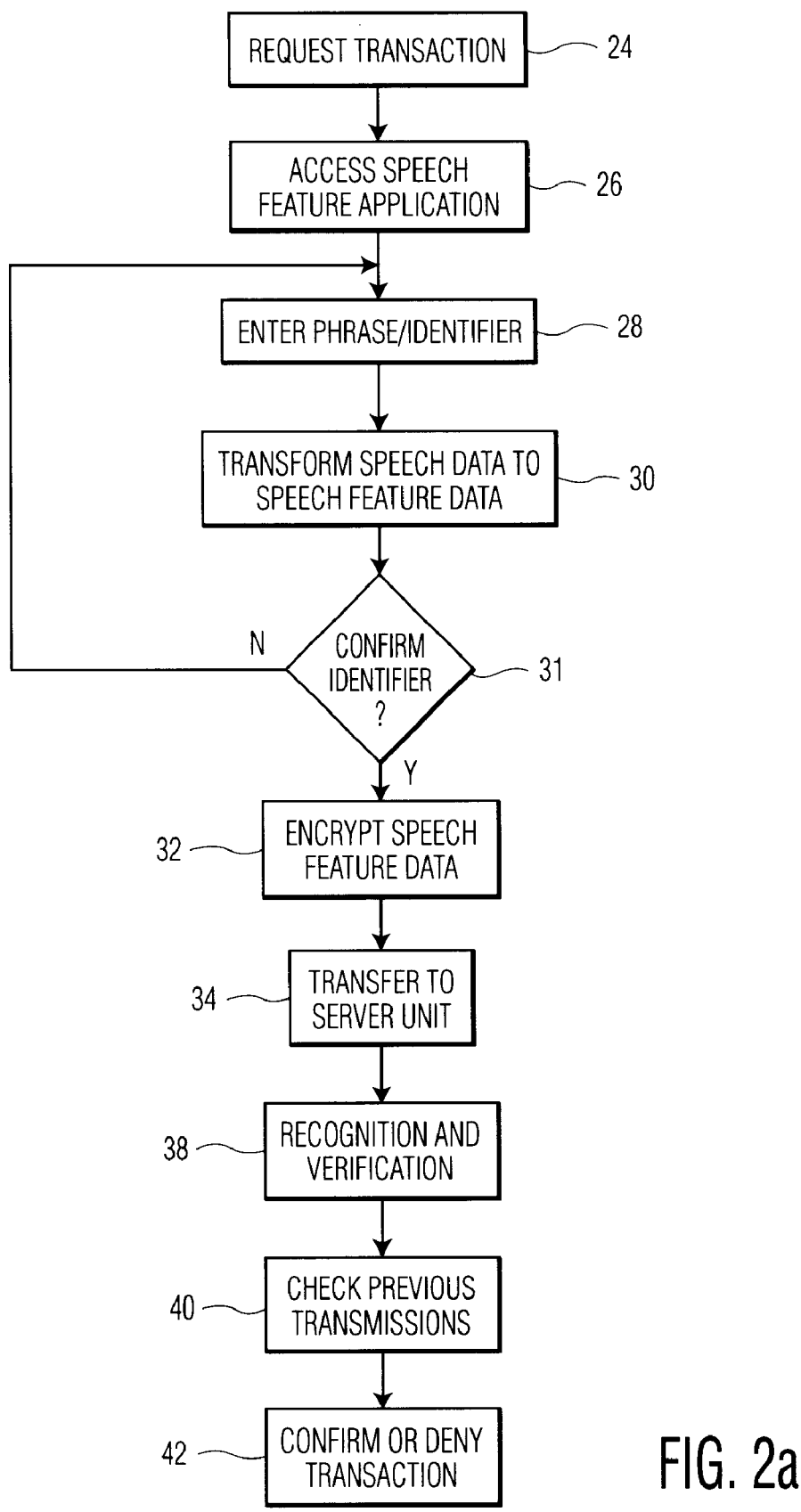
FIG. 2 is a block diagram showing the internal structure of a home server used in the system of FIG. 1.
Figure 2B:
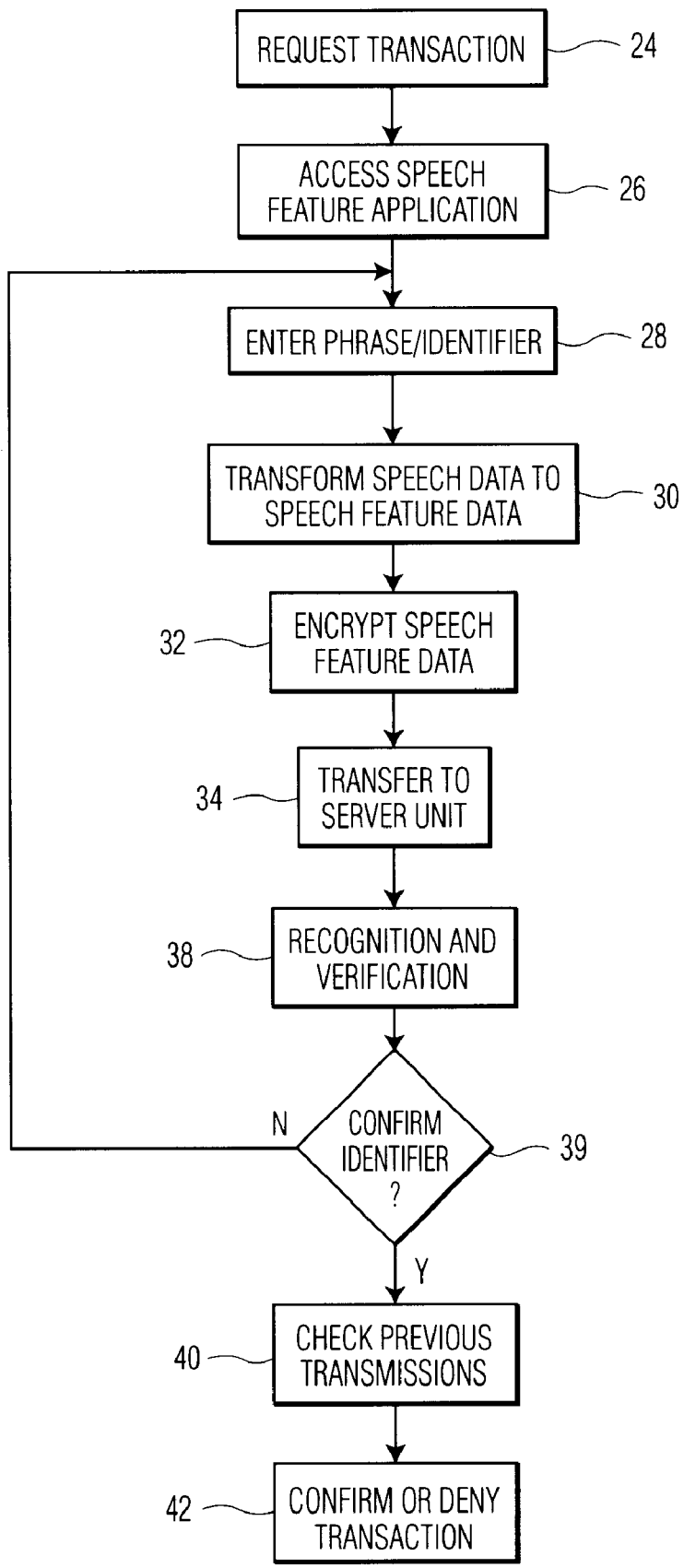

FIG. 2 is a block diagram showing the internal structure of the home server 1. In FIG. 2, reference numeral 11 represents a CPU serving as a control center for the home server 1. Specifically, the CPU 11 is provided not only for receiving various commands given by a user through a key board 12 to perform a series of operations in accordance with a flow chart shown in FIG. 5, but also for displaying various process results on a display 13 and for performing various controls shown by the blocks (which will be described later in the present specification). Here, any of the controls performed by the CPU 11 will be executed by reading out the programs (not shown) contained in the server 1. Reference numeral 14 is used to represent IDROM serving as a memory mainly for storing unique identification numbers possessed by the home server 1.

Reference numeral 15 is used to represent a transmitting/receiving unit containing a controller 151, a transmitter 152 and a receiver 153. Under the controls of the CPU It and the controller 151 and by means of a multiplexer 17 and an encoder 18, the transmitter 152 operates to modulate an audio signal supplied through address data bus lines 161, 162 from a some sound source such as a CD player 45, a tuner 46 and a HDD 16, and to transmit the modulated audio signal to the plurality of wireless speakers 3 (serving as man-machine interfaces). The receiver 153, under the controls of the CPU 11 and the controller 151, receives a signal supplied from the wireless terminal 2 or a wireless speaker 3. The received signal is decoded in a decoder 19, and downloaded (if necessary) on to the HDD 16 through the demultiplexer 20 and the address data bus lines 161, 162.

Figure 3:
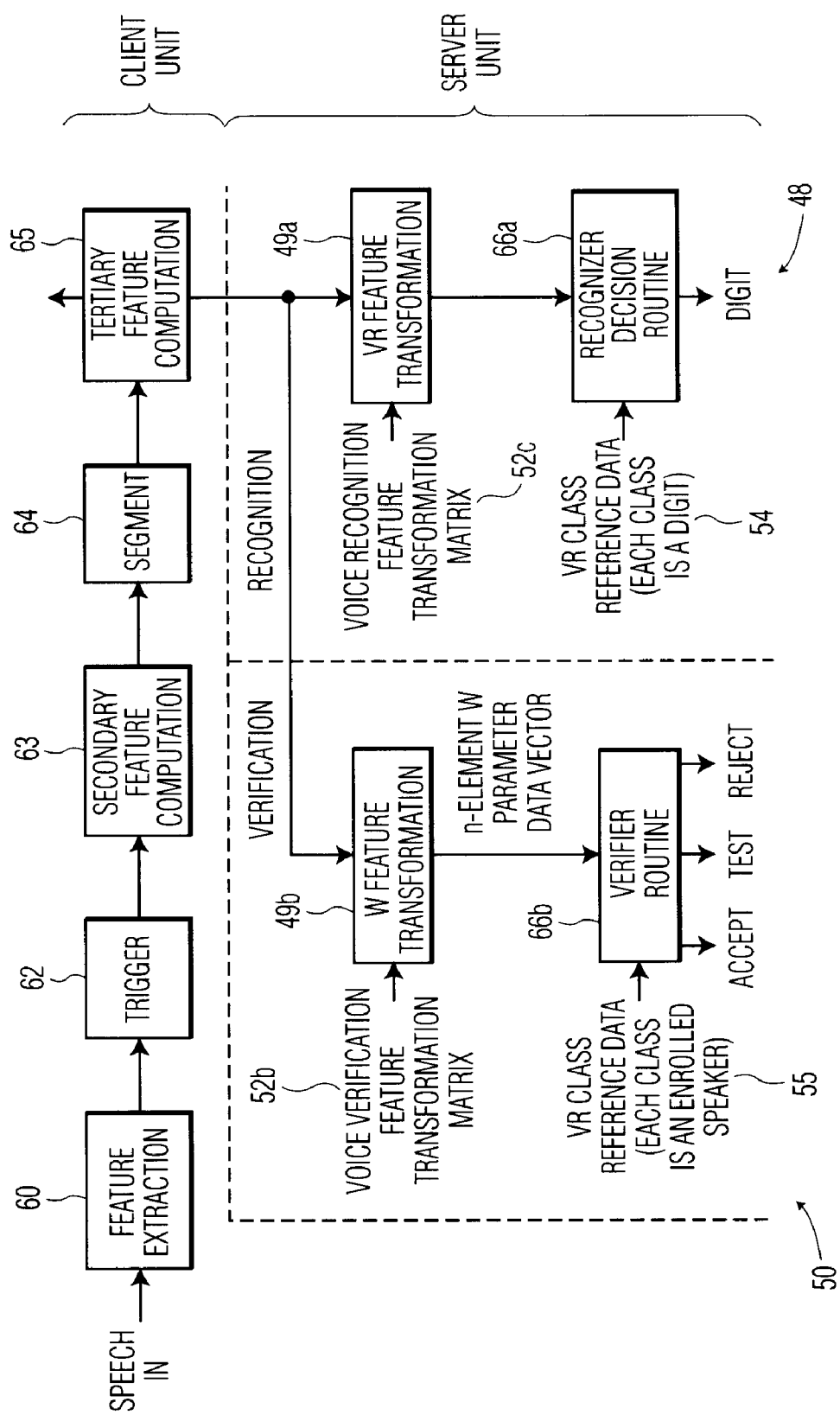
FIG. 3 is a block diagram showing the internal structure of a wireless terminal used in the system of FIG. 1.

FIG. 3 is a block diagram showing the internal structure of the wireless terminal 2. In FIG. 3, reference numeral 21 is a CPU serving as a control center for the wireless terminal. Specifically, the controls performed by the CPU 21 is executed by reading out instruction code (containing relay code which will be described later) representing the reproducing and recording instructions stored in an instruction code memory 25. The CPU 21 is also provided to perform input and output process through a key board 22 and a display 23. On the other hand, the unique identification numbers (ID) of the wireless terminal are stored in an IDROM 24.

Reference numeral 26 is used to represent a transmitting/receiving unit containing a controller 261, a transmitter 262 and a receiver 263. Under the controls of the CPU 21 and the controller 261, the transmitter 262 operates to supply a signal modulated in an encoder 42 to the home server 1 and the wireless speaker 3. The receiver 263, under the controls of the CPU 21 and the controller 261, operates to decode the received signal in a decoder 41, and to supply the signal to the CPU 21 through a demultiplexer 43.

At this time, an audio signal recorded in a HDD 27, under the control of the CPU 21 is converted into an analogue signal in a D/A converter 28, so as to be applied through an amplifier 29 to a portable speaker 30 installed in the wireless terminal 2.

Figure 4A:
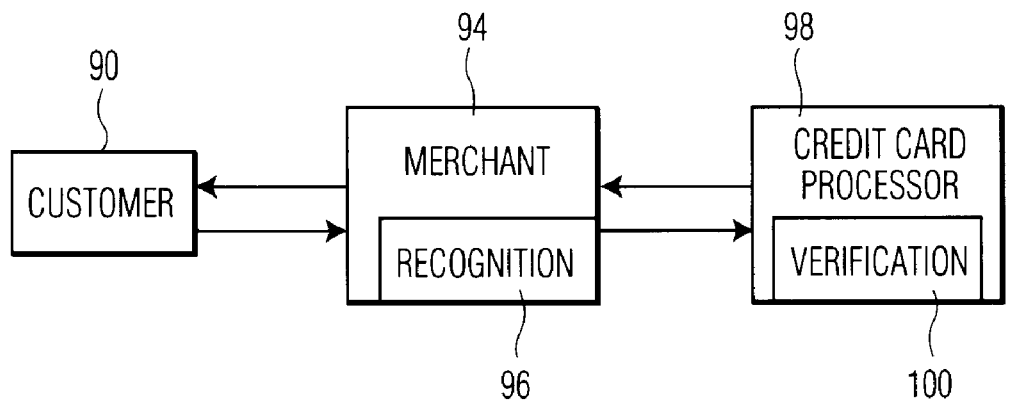
FIG. 4 is a block diagram showing the internal structure of a wireless speaker used in the system of FIG. 1.
Figure 4B:
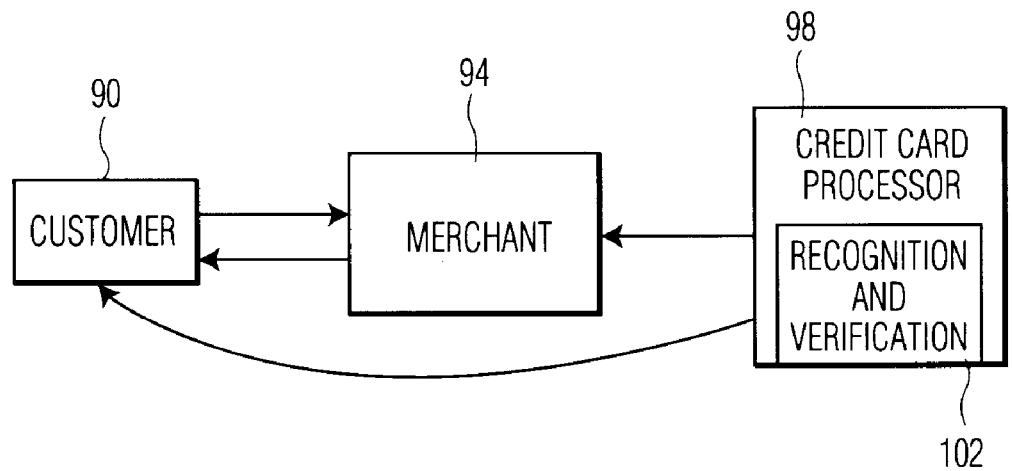

FIG. 4 is a block diagram showing the internal structure of a wire-less speaker 3. In FIG. 4, reference numeral 31 is a CPU serving as a control center for the wireless speaker. Specifically, the controls performed by the CPU 31 is executed in accordance with the programs contained in the wire-less speaker. On the other hand, the unique identification numbers (ID) of the wireless speaker 3 are stored in an IDROM 32.

Reference numeral 33 is used to represent a transmitting/receiving unit containing a controller 331, a transmitter 332, a receiver 333 and an electric field strength measuring section 334. The transmitter 332 operates so that a signal generated by the CPU 31 is modulated in an encoder 36 and then applied to the home server 1 (serving as a parent apparatus) or the wireless terminal 2 (serving as a child apparatus). The receiver 333, under the control of the controller 331, operates to decode an audio signal received from the home server 1 by means of a decoder 37, and to supply the signal to the CPU 31 by way of a demultiplexer 38. The audio signal received by the CPU 31 is converted by a D/A converter 39 into an analogue signal, and then applied through an amplifier 34 to a speaker 35 (serving as a man-machine interface) so as to be output as a desired sound.

The electric field strength measuring section 334, under the control of the CPU 31, operates to measure an electric field strength of a relay code transmitted from the wireless terminal 2. Here, the relay code is transmitted at a weak electric power and is used to determine whether or not a user is in the vicinity of the wireless speaker 3 (for example, an area having a semi-diameter of 50 cm). The receipt result of the relay code is then applied to the CPU 31.

In this way, there is formed a data transmission system for transmitting information data between the home server 1 and the wireless terminal 2. In accordance with a transmission request from the wireless terminal 2, the information data recorded in the HDD 16 of the home server 1 is read out and transmitted to the wireless terminal 2. After the information data of a predetermined unit amount (for example, one song or an ECC (Error Correction Code) block) has been transmitted, the data transmission is stopped so that information data recorded in the HDD 16 will no longer be read out.

Then, the wireless terminal 2 starts to record the predetermined amount of information data transmitted from the home server 1, while at the same time conducting the predetermined reproduction.

Although it has been described in the above that the information data is transmitted from the home server 1 to the wireless terminal 2, it is also possible for the information data to be transmitted from the wireless terminal 2 to the home server 1.

Figure 5:
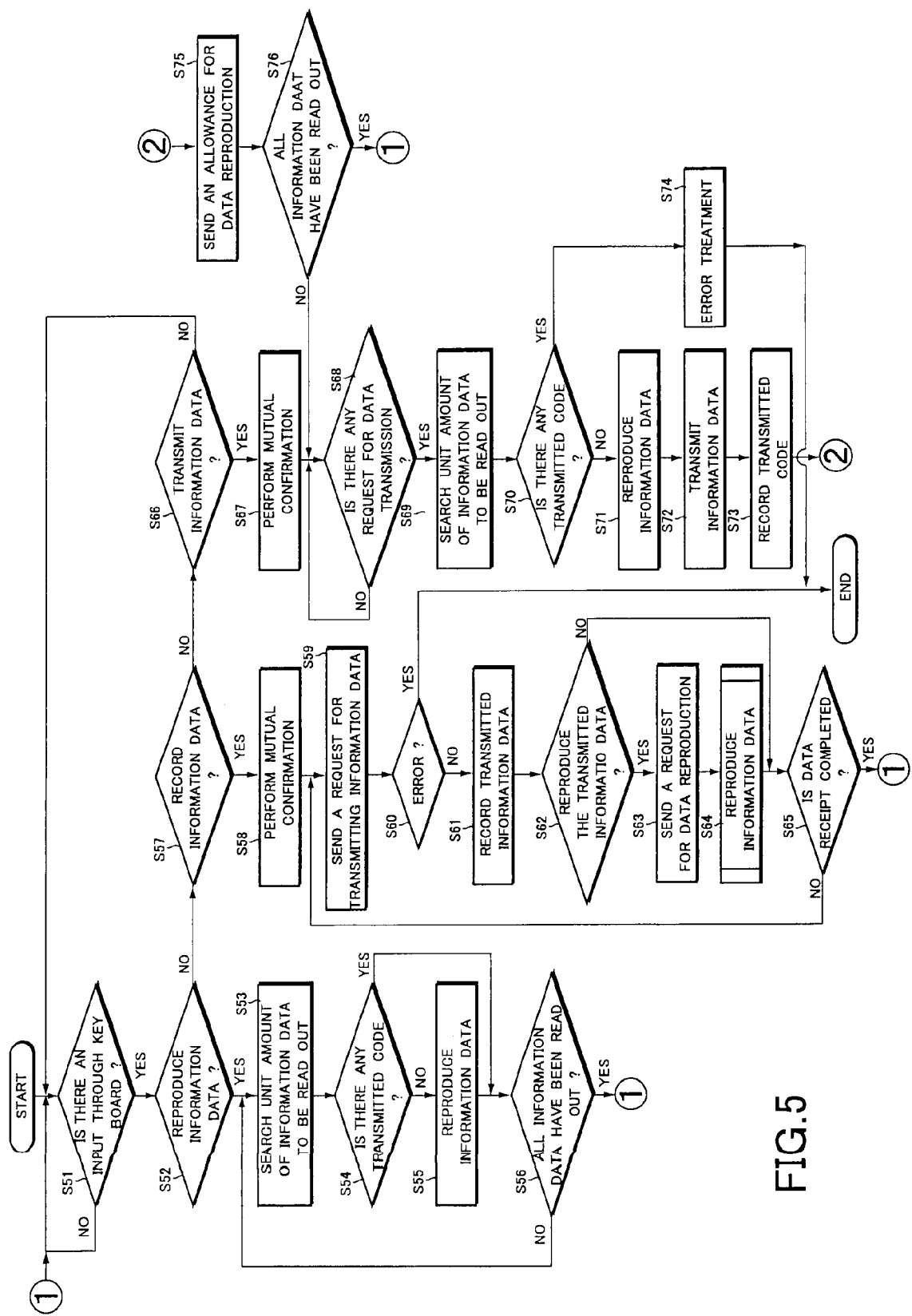
FIG. 5 is a flow chart showing a procedure for carrying out one embodiment of the present invention.

FIG. 5 is a flowchart showing an operation of the CPU 21 which serves as a control center for controlling the wireless terminal 2 shown in FIG. 3. In fact, the operation of the CPU 21 includes a reproducing mode, a recording mode and a transmitting mode. Each mode is also held by the home server 1 in the same manner, and these modes may be carried out in parallel with one another between the CPU 11 and CPU 21. Namely, when the CPU 11 contained in the home server 1 is executing a transmitting mode, the CPU 21 contained in the wireless terminal 2 can execute a recording mode. This will form a prerequisite for the following description of the present invention.

The operation of each mode will be described in detail below with reference to FIG. 5.

Reproducing Mode

At first, the CPU 21 contained in the wireless terminal 2 operates to scan the operating key board 22 to detect whether or not there has been an input through the key board 22 (step S51). At this time, if a reproducing instruction has already been issued, the process enters the reproducing mode, so as to search a unit amount of information that is to be read from the HDD 27 contained in the wireless terminal 2 (step S53). Meanwhile, existence of transmitted code (which is contained in each unit amount of information data) is checked (step 54), and a reproducing operation is forbidden if there is existing such a transmitted code, but will be executed if there is not existing such a transmitted code (step S55). The reading of the information data from the HDD 27 is repeated in accordance with the number of requested songs or corresponding to the number of ECC (Error Correction Code) blocks (step S56).

Recording Mode

At first, the CPU 21 contained in the wireless terminal 2 operates to perform a mutual confirmation with the home server 1 (step S58) to confirm that the wireless terminal 2 and the home server 1 are allowed to be connected with each other for exchanging predetermined information data in accordance with a predetermined protocol. Then, a data transmission request is sent to the home server 1 (step 59).

Once the home server 1 has received the above data transmission request (step S68), the HDD 16 contained in the home server 1 is searched with regard to the information data that is to be read therefrom. At this time, it is checked whether there is existing a transmitted code (step S70). If there is existing such a transmitted code, an error treating process is executed (step S74) since the required information data has already been transmitted, thereby producing a reply (indicating that the required information data has already been transmitted) to the wireless terminal 2 (step S60).

On the other hand, if there is not such an error, the CPU 21 contained within the wireless terminal 2 will record the information (transmitted hereto) in the HDD 27 contained in itself (step S61). Next, it is checked or not there is a request for reproduction while the information data is being recorded in the HDD 27. If an instruction is given for information reproduction (step S62) a reproduction process is started (steps S63 and S64). If not, the above operations (steps S59 to S64) are repeated until the information recording is finished.

Transmitting Mode

The CPU 11 contained in the home server 1 operates to perform a mutual conformation (step S67) in the same manner as in the above recording mode. Next, it is checked or not the home server 1 has received a data transmission request from the wireless terminal 2 (step S68). If the home server 1 has received such a transmission request from the wireless terminal 2, information data is searched (step S69) which is a collection of unit amounts of information to be read from the HDD 16. At this time, it is checked or not the transmitted code has been recorded (step S70). If the transmitted code has been recorded, the reproducing operation will be forbidden (since the data transmission has already been finished). Thus, an error treating process is executed (step S74). On the other hand, if the transmitted code has not been recorded, the reproducing process is conducted (step S71), while at the same time transmitting a predetermined amount of the reproduced information to the wireless terminal 2 (step S72).

At this time, transmitted code is recorded (step S73) and data reproduction allowance is transmitted (step S75). Here, since the information data is transmitted in the unit of ECC block, such a data transmission may be completed in a short time. Moreover, when the information data is being transmitted, the transmitted data is reproduced. In this way, after the transmitted code has been recorded, the information data stored in the HDD 16 of the home server 1 is made ineffective, white the information data recorded in the HDD 27 of the wireless terminal 2 is made effective. Accordingly, data reproduction allowance is thus issued from the home server 11 to the wireless terminal 2 to reproduce information from the HDD 27 (step S75). In this way, the above steps from the step S68 onward are repeated until the data to be transmitted are all read out (step S76).

In the above embodiment of the present invention, although transmitted code has been used, and the reproduction of information data may be forbidden by recording the transmitted code, the forbidding of the reproduction of information data can also be effected by erasing the transmitted data (remaining in original apparatus such as the home server 1). On the other hand, in the case where the transmitted code has been used and where, for example, data is transmitted from the home server 1 to the wireless terminal 2 and the reproduced information is again transmitted from the wireless terminal 2 to the home server 1, these data can be used by only erasing the transmitted code. In this way, it is allowed to dispense with some operations such as the erasing and rewriting of the information data, thereby making it possible to reduce an overload on the CPUs.

Figure 6:
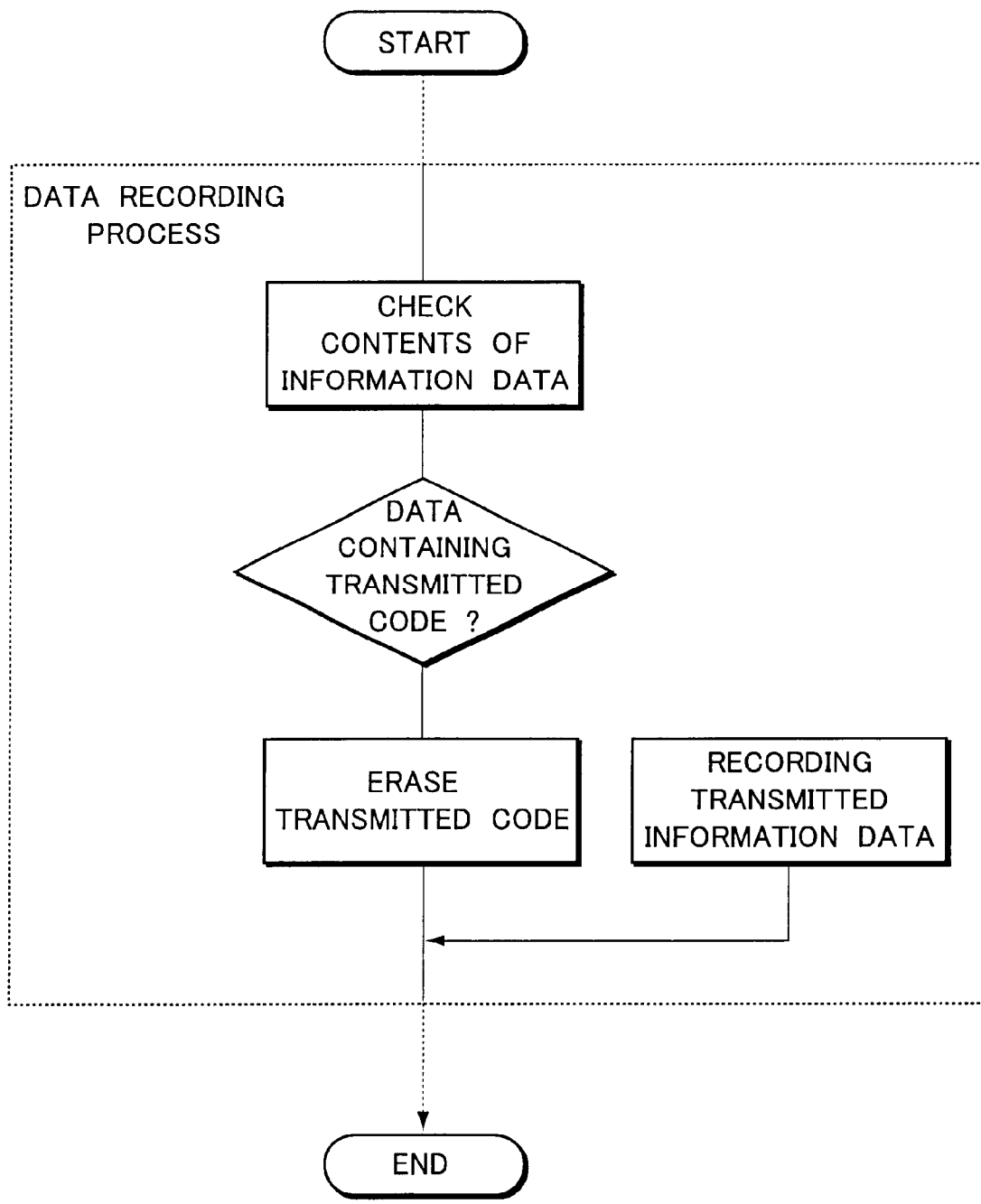
FIG. 6 is a flow chart showing part of the embodiment of FIG. 5.

FIG. 6 is a flowchart indicating how the transmitted code can be processed during a recording process.

As shown in FIG. 6, the CPU 11 (the CPU 21) contained in the home server 1 (the wireless terminal 2) operates to check (step S81) the content recorded in the HDD 16 (the HDD 27), so as to confirm whether or not it is data containing transmitted code (step S82). If it is data containing transmitted code, the transmitted code is erased (if the data is to be reproduced). On the other hand, if it is not data containing transmitted code, the data transmitted hereto will be recorded in the HDD 16 (HDD 27). In this way, since the corresponding information data can be reproduced only by erasing the transmitted code, when information data is transmitted from one apparatus to another, it is allowed to dispense with some operations for erasing and rewriting the information data thereby reducing an overload on the CPU 11 (CPU 21).

In the above embodiment of the present invention, the home server 1 serves as a sound source which is surrounded by a plurality of wireless speakers 3 serving as man-machine interfaces. With the movement of the wireless terminal 2, it is allowed to select one of the wireless speakers (for use). However, the present invention should not be limited to such a specific arrangement. In fact, it is also possible to employ other sort of apparatus provided that it is a reproducing apparatus capable of performing a communication with other apparatus. In addition, the present invention can also be applied to a system involving the transmission of image data, and it is sure to obtain the similar effect. Further, more remarkable effect can be obtained if the present invention is applied to a system which involves the transmission of image data and permits data information to be transmitted to apparatus having an excellent portability (such as an MD player).

With the use of the present invention, when information data is transmitted from a recording medium of one apparatus to a recording medium of another apparatus, the same identical data information will not be existing in several different recording mediums. In this way, data information can be recorded in a recording medium such as an MD having an excellent portability, without damaging a concept of duplicating information data. Further, since the information data to be transmitted has been processed to be present in quite small unit, information data such as music data can be reproduced almost simultaneously in a plurality of apparatus (among which information data is transmitted from one another), without duplication of the information data.

Furthermore, since digital data can be transmitted and received in a wireless manner, it is sure to prevent any decrease in the quality of music sound, also to prevent any possible restriction to the movement of a user when he or she is using the method and system of the present invention. In addition, since the information data is transmitted and received under a condition where a mutual confirmation has been completed, it is sure to prevent any unlawful duplication of the data information and to prevent the information data from being accidentally erased. In particular, under the present situation where data communication and data duplication have been made greatly easier than before, the present invention is useful for preventing unlawful duplication, thereby permitting the present invention to be quite useful in future in the field of data communication.

While the presently preferred embodiments of the this invent ion have been shown and described above, it is to be understood that these disclosures are for the purpose of illustration and that various changes and modifications may be made without departing from the scope of the invention as set forth in the appended claims.

What is claimed is:

1. An information reading and recording method for effecting data transmission among a plurality of information processing apparatuses, said method comprising the steps of:

reading and outwardly transmitting information data recorded on a recording medium of one information processing apparatus, in accordance with a transmission request from another information processing apparatus;

rendering ineffective a predetermined unit amount of information data recorded on the recording medium of said one information processing apparatus, at a time the predetermined unit amount of information data has been transmitted therefrom; and recording the predetermined unit amount of transmitted information data in said another information processing apparatus which has received the transmitted information data from said one information processing apparatus, wherein each predetermined unit amount of information data is provided with a transmitted code indicating that said unit amount of information has already been transmitted therefrom, and wherein when another transmission request is received, the information data is checked for the transmitted code so that it can be determined whether the information to be transmitted should be reproduced, wherein if the check shows that the transmitted code has been provided, it is determined that the information data has already been transmitted so that the data transmission to said plurality of information processing apparatuses, including said another information processing apparatus, is forbidden.

2. A method according to claim 1, wherein said another information processing apparatus is adapted to record the transmitted information data while at the same time reproducing the transmitted information.

3. An information reading system for reading information data from a recording medium of one information processing apparatus and transmitting the information data in accordance with a transmission request from another information processing apparatus, said system comprising:

reading means for reading-out information data from the recording medium in accordance with a control signal;

transmitting means for outwardly transmitting the read-out information data;

storing means for storing transmitted code indicating that the information data has been transmitted, corresponding to each unit amount of information to be transmitted;

detector means for checking for and detecting a transmitted code in the information data when another transmission request is received; and control means for producing a control signal for controlling the reading of said information data, and for producing another control signal for forbidding the reading of the information data when a corresponding transmitted code has been detected, wherein if the checking shows that the transmitted code has been provided it is determined that the information data has already been transmitted so that the data transmission to all information processing apparatuses, including said another information processing apparatus, is forbidden.

4. An information reading system according to claim 3, wherein the transmitting means for transmitting the read-out information comprises:

confirmation means for confirming whether or not a plurality of different information processing apparatus are allowed to be connected with one another;

an allowance issuing means for issuing an allowance for transmitting information data when it has been confirmed by the confirmation means that the plurality of different information processing apparatus are all legally connected with one another.

5. An information reading system according to claim 4, wherein said confirmation means is provided for confirming whether or not a plurality of different information processing apparatus are allowed to be connected with one another for exchanging predetermined data in accordance with a predetermined protocol.

6. An information reading system according to claim 4, wherein said allowance issuing means is provided for issuing an allowance for transmitting information data when it has been confirmed by the confirmation means that the plurality of different information processing apparatus are all legally connected with one another for exchanging predetermined data in accordance with a predetermined protocol.

7. An information recording system adapted to record information containing transmitted code corresponding to information data to be transmitted, said system comprising:

determining means for determining whether or not there is existing transmitted code corresponding to transmitted information data;

recording means for recording the transmitted information data when it is determined by the determining means that there is not existing said transmitted code, and for erasing the transmitted code when it is determined that there is existing said transmitted code.

8. An information recording system according to claim 7, wherein said recording means includes:

confirmation means for confirming whether or not a plurality of different information processing apparatus are allowed to be connected with one another;

an allowance issuing means for issuing an allowance for transmitting information data when it has been confirmed by the confirmation means that the plurality of different information processing apparatus are all legally connected with one another.

9. An information reading system according to claim 8, wherein said confirmation means is provided for confirming whether or not a plurality of different information processing apparatus are allowed to be connected with one another for exchanging predetermined data in accordance with a predetermined protocol.

10. An information reading system according to claim 8, wherein said allowance issuing means is provided for issuing an allowance for transmitting information data when it has been confirmed by the confirmation means that the plurality of different information processing apparatus are all legally connected with one another for exchanging predetermined data in accordance with a predetermined protocol.

\* \* \* \* \*